United States Patent
Balensiefer et al.

(10) Patent No.: US 7,178,872 B2
(45) Date of Patent: Feb. 20, 2007

(54) QUICK-MOUNT CHILD-RESTRAINT SYSTEM

(75) Inventors: Eugene R. Balensiefer, Seymour, IN (US); Jason A. Crowell, Columbus, IN (US); William Horton, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 155 days.

(21) Appl. No.: 10/994,071

(22) Filed: Nov. 19, 2004

(65) Prior Publication Data

US 2006/0108845 A1    May 25, 2006

(51) Int. Cl.
*B60N 2/28* (2006.01)
(52) U.S. Cl. .................. 297/250.1; 297/468
(58) Field of Classification Search ............. 297/484, 297/250.1, 256.16, 468; 24/114.5, 265 R, 24/265 AL
See application file for complete search history.

(56) References Cited

U.S. PATENT DOCUMENTS

| | | | | |
|---|---|---|---|---|
| 3,323,186 A | * | 6/1967 | Rennert | 410/116 |
| 3,765,063 A | * | 10/1973 | Farley | 410/116 |
| 4,376,551 A | * | 3/1983 | Cone | 297/256.13 |
| 4,402,548 A | * | 9/1983 | Mason | 297/464 |
| 4,685,741 A | * | 8/1987 | Tsuge et al. | 297/467 |
| 6,155,638 A | * | 12/2000 | Bapst | 297/250.1 |
| 6,543,847 B2 | | 4/2003 | Balensiefer | |
| 6,619,752 B1 | | 9/2003 | Glover | |
| 6,695,412 B2 | * | 2/2004 | Barger et al. | 297/484 |

* cited by examiner

*Primary Examiner*—Peter M. Cuomo
*Assistant Examiner*—Tania Abraham
(74) *Attorney, Agent, or Firm*—Barnes & Thornburg LLP

(57) ABSTRACT

A juvenile vehicle seat includes a seat shell and a child-restraint belt coupled to the seat shell. A seat pad is provided on the seat shell and the child-restraint belt passes through apertures formed in the seat pad.

27 Claims, 3 Drawing Sheets

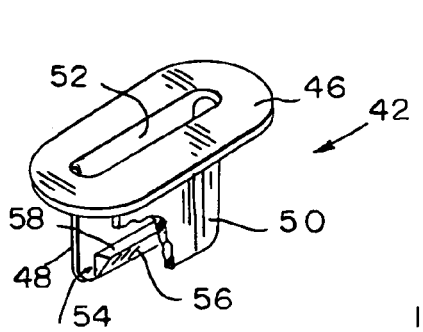
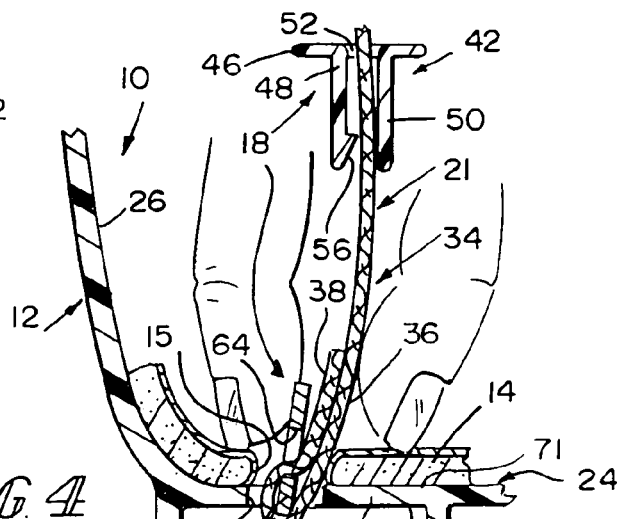
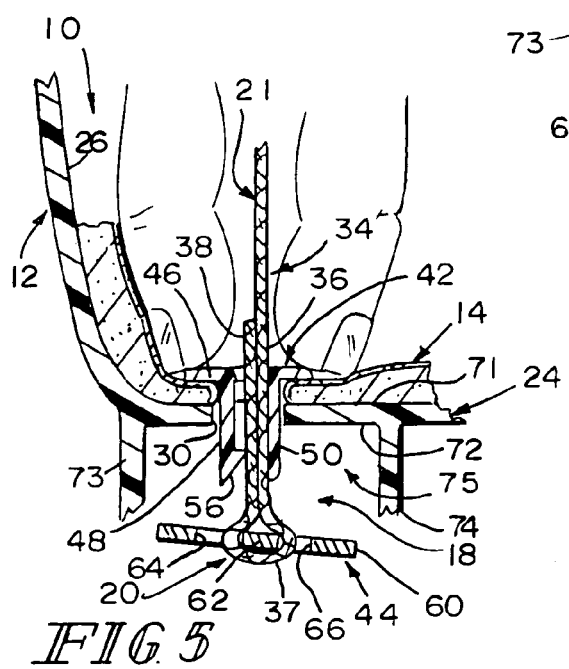
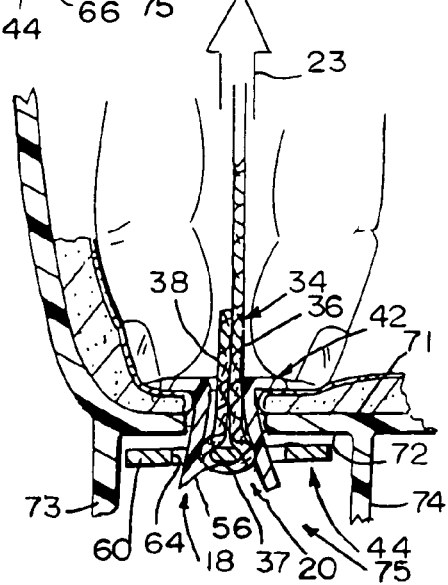
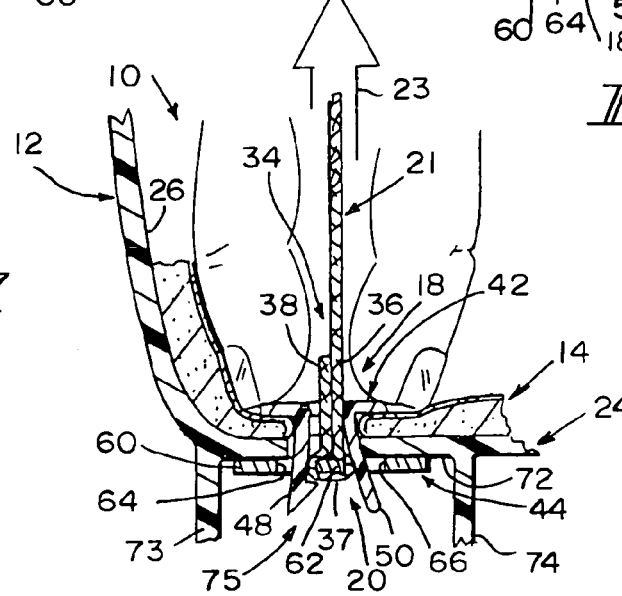

QUICK-MOUNT CHILD-RESTRAINT SYSTEM

BACKGROUND

The present disclosure relates to juvenile vehicle seats and, in particular, to child-restraint systems for juvenile vehicle seats. More particularly, the present disclosure relates to apparatus and methods for coupling child-restraint straps to seat shells.

SUMMARY

A juvenile vehicle seat in accordance with the present disclosure comprises a seat shell, a child-restraint harness, and a belt anchor. The child-restraint harness includes a belt passing through a slot formed in a wall of the seat shell. The belt anchor includes a retainer plate and a belt guide arranged to extend through the slot in the seat shell wall and formed to include a belt-receiver channel through which the belt passes.

The belt guide and the retainer plate cooperate to anchor a free end of the belt in a fixed position relative to the wall of the seat shell. A portion of the belt guide faces toward a top side of the seat shell wall while the retainer plate faces toward a bottom side of the seat shell wall. The free end of the belt is coupled to the retainer plate and the belt extends upwardly through the belt-receiver channel in the belt guide and the slot in the seat shell wall.

During installation, in an illustrative process, a harness installer first passes the retainer plate carrying a free end of the belt through the slot formed in the seat shell and then slides the belt guide downwardly along the upwardly extending belt to fit into the slot. Next, the installer pulls "up" on the belt to mate the free end of the belt with the belt guide and move the retainer plate to engage a bottom side of the seat shell wall. In this manner, the child-restraint harness is coupled quickly and easily to the seat shell using the belt anchor defined by the retainer plate and the belt guide.

In illustrative embodiments, the belt guide includes a perimeter flange formed to include the belt-receiver channel and two legs cantilevered to the perimeter flange and arranged to extend through the slot formed in the wall of the seat shell. The retainer plate includes a belt mount coupled to the free end of the belt and a pair of openings receiving the legs of the belt guide to cause the belt mount and the free end of the belt to lie between the legs.

A seat pad is interposed between the perimeter flange of the belt guide and the wall of the seat shell in illustrative embodiments. The legs of the belt guide and the belt are also arranged to extend through a slot formed in the seat pad along with the slot formed in the wall of the seat shell. The perimeter flange faces toward the top side of the seat shell wall and engages the seat pad to trap the seat pad against the top side of the seat shell wall. The retainer plate engages a bottom side of the seat shell wall. The free end of the belt and the belt mount of the retainer plate are wedged in a space between the two legs of the belt guide to anchor the belt to the seat shell.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 3 is an enlarged perspective view of a snap-in belt guide, with portions broken away, included in the quick-mount belt anchor;

FIG. 4 is an enlarged sectional view showing a person beginning to couple the quick-mount belt anchor of FIGS. 1 and 2 to a seat shell by passing a retainer plate coupled to a free end of the belt through a slot formed in the seat shell and through a slot formed in seat pad on the seat shell and showing the snap-in belt guide arranged to lie above the seat shell and slide back and forth along the belt;

FIG. 5 is a sectional view similar to FIG. 4 showing movement by the person of the snap-in belt guide along the belt to extend into the slots formed in the seat shell and seat pad;

FIG. 6 is a sectional view similar to FIGS. 4 and 5 showing upward movement of the belt away from the slots formed in the seat shell and seat pad to move simultaneously a belt mount included in the retainer plate and a looping section of the belt coupled to the belt mount upwardly to engage and "push against" a leg-spreader ramp provided on a first leg of the snap-in belt guide so as to spread first and second legs included in the snap-in belt guide away from one another;

FIG. 7 is a sectional view similar to FIGS. 4–6 showing further upward movement of the belt to cause the retainer plate to engage a bottom side of the seat shell to block further upward movement of the belt relative to the seat shell and to trap the looping section of the belt and the belt mount of the retainer plate in a space located substantially below the seat shell bottom and above the leg-spreader ramp on the first leg of the snap-in belt guide.

DETAILED DESCRIPTION

Figure 1:
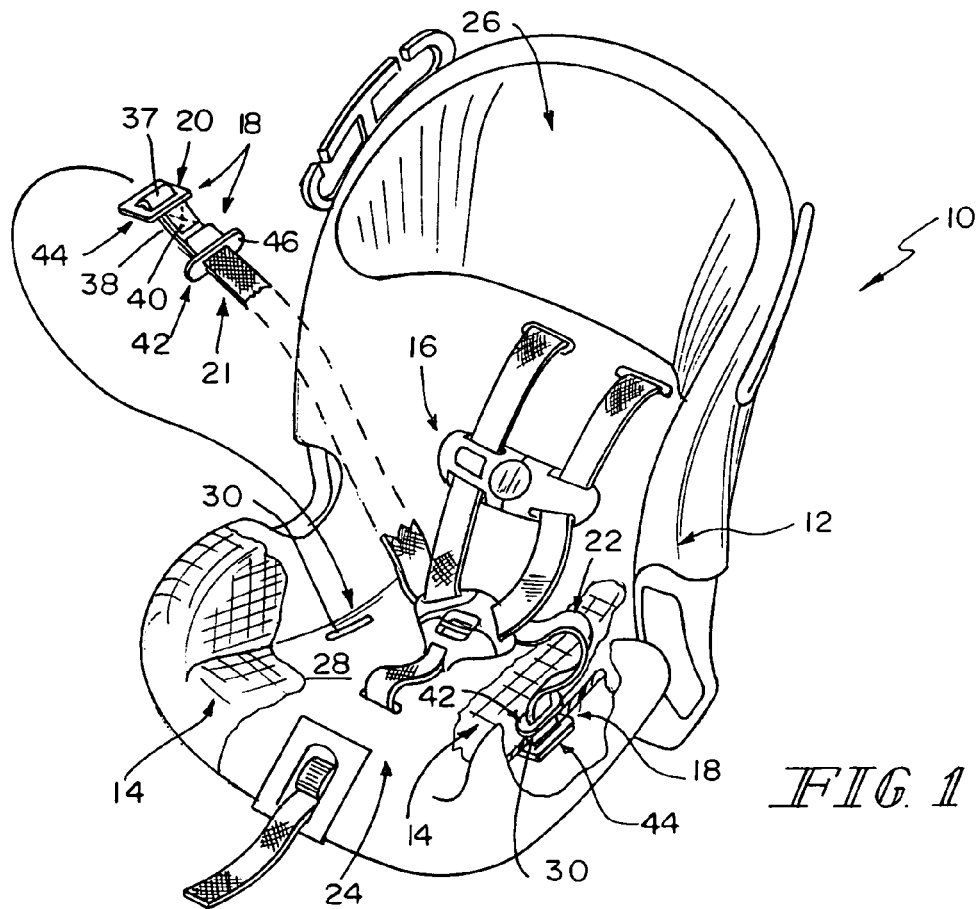
FIG. 1 is a perspective view of a juvenile vehicle seat, with portions broken away, showing (on the left) a child-restraint belt equipped with a "quick-mount" belt anchor in accordance with the present disclosure before it is coupled to a seat shell bottom included in the juvenile vehicle seat in a manner shown, for example, in FIGS. 4–7, and showing (on the right) a similar child-restraint belt already coupled to the seat shell bottom.
Figure 2:
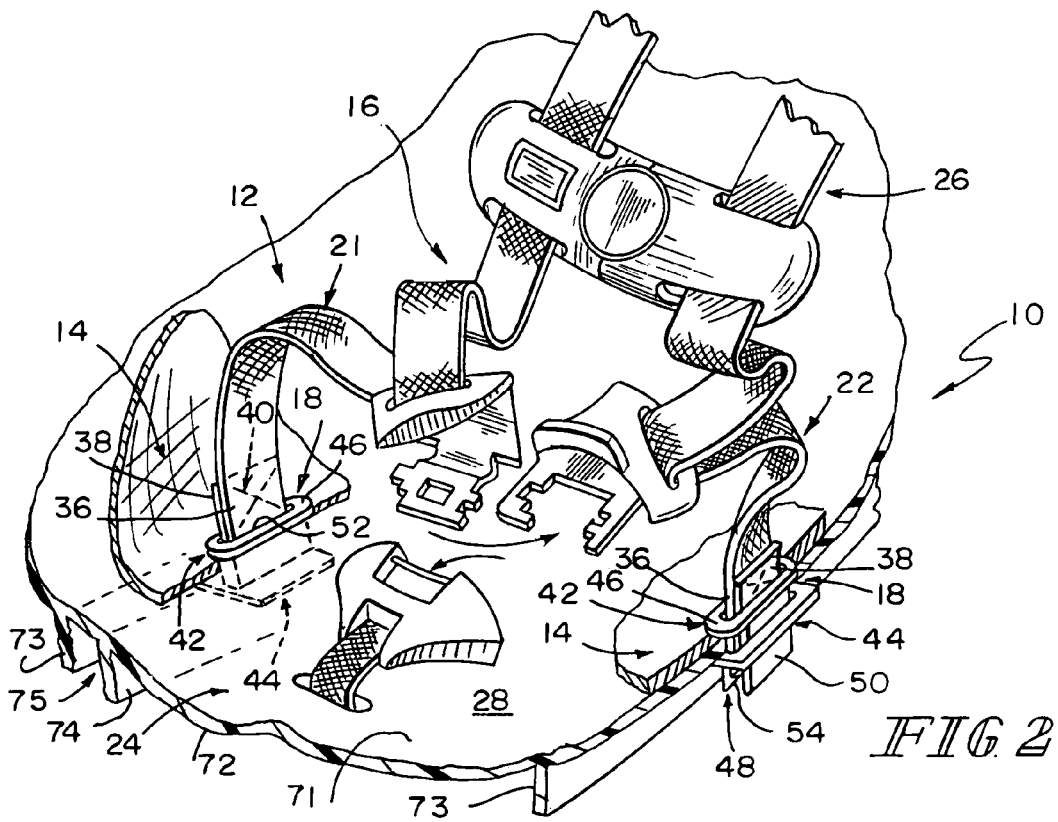
FIG. 2 is an enlarged perspective view of the child-restraint harness shown in FIG. 1 showing the two quick-mount belt anchors after they have been coupled to the seat shell.

A juvenile vehicle seat 10 includes a seat shell 12, a seat pad 14 covering a portion of seat shell 12, and a child-restraint harness 16 as shown in FIGS. 1 and 2. A belt anchor 18 is coupled to each of belts 21, 22 included in child-restraint 16 and used to anchor those belts 21, 22 to seat shell 12 as shown, for example, in FIGS. 4–7.

Seat shell 12 includes a seat bottom 24 and seat back 26 extending upwardly from seat bottom 24 as suggested in FIG. 1. As shown, for example, in FIGS. 1 and 4, seat shell 12 includes a wall 28 formed to include a slot 30 for each belt anchor 18. In the illustrated embodiment, wall 28 supports a child (not shown) seated on seat bottom 24. It is within the scope of the present disclosure to form slot 30 in another spot on seat shell 12 so that one of belts 21, 22 can be anchored to seat shell 12 at such a designated spot.

Each belt 21, 22 has a free end 20 associated with one of belt anchors 18 as suggested, for example, in FIG. 2. In an illustrative embodiment, belt 21 includes a free end 20 and a harness portion 34 coupled to free end 20 as suggested in FIG. 4. Harness portion 34 comprises a lower section 36 of belt 21, an anchor section 38 of belt 21, and a fastener 40 (e.g., stitching) to fix anchor section 38 to lower section 36 as shown, for example, in FIGS. 1 and 4. In the illustrated embodiment, free end 20 of belt 21 (and belt 22) is defined by a looping section 37 arranged to interconnect lower section 36 to anchor section 38.

Belt anchor 18 includes a belt guide 42 and a retainer plate 44 as shown, for example, in FIGS. 1 and 4. Belt guide 42 is mounted for movement on belt 21 toward and away from free end 20 and is arranged to help secure retainer plate 44 to seat shell 12 without interfering with other functions of juvenile vehicle seat 10 or child-restraint harness 16. Retainer plate 44 is configured to cooperate with belt guide 42 to anchor belt 21 to wall 28 of seat shell 12 in a manner shown, for example, in FIGS. 4–7. In an illustrative embodiment, belt guide 42 is made of polypropylene or other similar material and retainer plate 44 is made of metal.

Belt guide 42 includes a perimeter rim 46 and first and second legs 48, 50 cantilevered to perimeter rim 46 as shown, for example, in FIG. 3. Perimeter rim 46 is formed to include belt-receiver channel 52 and belt 21 is sized to extend through and move back and forth freely in belt-receiver channel 52 as suggested in FIGS. 3–5.

Belt guide 42 further includes a belt retainer 54 appended to first leg 48 as shown, for example, in FIG. 3. Belt retainer 54 is arranged to confront free end 20 of belt 21 as shown, for example, in FIG. 7 to block movement of free end 20 of belt 21 and retainer plate 44 coupled to free end 20 of belt 21 away from wall 28 of seat shell 12 when that free end 20 is anchored to seat shell 12. Belt retainer 54 includes ramp means 56 for urging first leg 48 away from second leg 50 during movement of free end 20 of belt 21 in upward direction 23 toward belt receiver channel 52 formed in belt guide 42 as suggested in FIGS. 5 and 6. As suggested in FIGS. 3 and 7, belt retainer 54 also includes stop means 58 for blocking movement of free end 20 of belt 21 away from wall 28 of seat shell 12 and past ramp means 56 upon movement of free end 20 to a retained position between first and second legs 48, 50 of belt guide 42.

As suggested in FIG. 7, looping section 37 of free end 20 of belt 21 is coupled to retainer plate 44 and located between first and second legs 48, 50 of belt guide 42 when belt 21 is anchored to seat shell 12. In the illustrated embodiment, retainer plate 44 includes a perimeter flange 60 and a belt mount 62 coupled to perimeter flange 60. Retainer plate 44 is formed to include a first opening 64 sized to receive first leg 48 and a first portion of looping section 37 and a second opening 66 sized to receive second leg 50 and a second portion of looping section 37 as suggested in FIGS. 6 and 7. Belt mount 62 is located between first and second openings 64, 66 and is coupled to looping section 37 of free end 20 of belt 21. Perimeter flange 60 borders portions of first and second openings 64, 66.

As suggested in FIGS. 2 and 4, wall 28 of seat shell 12 includes a first (top) side 71 and an opposite second (bottom) side 72. Pad 14 is arranged to lie on first side 71 and is formed to include a slot 15 that is aligned with slot 30 formed in wall 28 of seat shell 12. Seat shell 12 includes a first rigidifying rib 73 appended to second side 72 of wall 28 and a second rigidifying rib 74 also appended to second side 72 of wall 28. First and second rigidifying ribs 73, 74 lie in spaced-apart and closely confronting relation to one another to rigidify wall 28 in a region around slot 30. Ribs 73, 74 also cooperate to define a narrow channel 75 therebetween containing first and second legs 48, 50 and retainer plate 44 as shown in FIGS. 6 and 7.

An illustrative sequence for coupling belt anchor 18 to seat shell 12 is shown in FIGS. 4–7. A harness installer passes a retainer plate 44 coupled to a rear end 20 of belt 21 through a slot 15 formed in a seat pad 14 and another slot 30 formed in seat shell 12 while a belt guide 42 is located above eat pad 14 and arranged to slide back and forth on belt 21. Retainer plate 44 is oriented to lie in a nearly vertical plane as it is passed through slots 15, 30 as shown in FIG. 4.

Once retainer plate 44 arrives in narrow channel 75 under wall 28 and between rigidifying ribs 73, 74, retainer plate 44 is reoriented to lie in a somewhat horizontal plane and in spaced-apart relation to overlying second side 72 of wall 28. At this stage, belt guide 42 is moved downwardly toward wall 28 along belt 21 to cause legs 48, 50 to extend through slots 15, 30 and into narrow channel 75 and to cause perimeter rim 46 to mate with and engage seat pad 14 as suggested in FIG. 5. In this "intermediate" position, harness portion 34 of belt 21 extends upwardly through a space between legs 48, 50, through slots 30, 15, and through belt-receiver channel 52 formed in perimeter rim 46 of belt guide 42 as also shown, for example, in FIG. 5.

As shown in FIG. 6, upward movement in direction 23 of belt 21 away from slots 30, 15 formed in seat shell 12 and seat pad 14 simultaneously moves belt mount 62 of retainer plate 44 and looping section 37 of free end 20 of belt 21 upwardly to engage and push against a leg-spreader ramp 56 provided on first leg 48 of belt guide 52 so as to spread first and second legs 48, 50 away from one another. Further upward movement in direction 23 of belt 21 causes retainer plate 44 to engage second side 72 of wall 28 of seat shell 12 to block further upward movement of belt 21 relative to seat shell 12. Looping section 37 and belt mount 62 are "trapped" in a space located substantially below wall 28 and above leg-spreader ramp 56 on first leg 48 of belt guide 52.

Once installed, one of belt anchors 18 couples free end 20 of belt 21 to seat shell 12 as shown, for example, in FIGS. 2 and 7. Another of belt anchors 18 couples free end 20 of belt 21 to seat shell 12 as shown, for example, in FIGS. 1 and 2.

Retainer plate 44 is configured to cooperate with a companion belt guide 42 to anchor belt 21 to wall 28 of seat shell 12 as shown in FIGS. 2 and 7. Perimeter rim 46 of belt guide 42 is arranged to face toward first side 71 of wall 28. Retainer plate 44 is coupled to free end 20 of belt 21 and is arranged to engage an opposite second side 72 of wall 28. Harness portion 34 of belt 21 is arranged to extend from free end 20 through belt-receiver channel 52 formed in belt guide 42 in the illustrated embodiment. Free end 20 of belt 21 terminates in a space provided between first and second legs 48, 50 of belt guide 42.

As suggested in FIG. 7, looping section 37 of free end 20 of belt 21 has a "spread width" that is greater than a width of belt-receiver channel 52 to block movement of looping section 37 through belt-receiver channel 52 upon engagement of retainer plate 44 and the opposite second side 72 of wall 28. Belt mount 62 is coupled to perimeter flange 60 to provide retainer plate 44 with a first opening 64 receiving a first portion of looping section 37 and a second opening 66 receiving a second portion of looping section 37. Belt mount 62 of retainer plate 44 is located between first and second legs 48, 50 of belt guide 42 and is sized to "spread" looping section 37 to assume the spread width upon movement of perimeter flange 60 to engage the opposite second side 72 of wall 28 forming a seat bottom of seat shell 12. Thus, retainer plate 44 includes means for spreading free end 20 of belt 21 to assume a spread width to block movement of free end 20 through belt receiver channel 52 formed in belt guide 42 and through slots 30, 15 formed in seat shell wall 28 and seat pad 14 so that free end 20 of belt 21 is anchored to seat shell 12.

As suggested in FIGS. 6 and 7, belt mount 62 of retainer plate 44 and free end 20 of belt 21 cooperate to splay first and second legs 48, 50 of belt guide 42. This splaying action causes first and second legs 48, 50 to diverge in a direction away from slot 30 in wall 28 to block upward movement of first and second legs 48, 50 through slot 30 so that belt guide 42 is retained in a fixed position in slot 30. Free end 20 of belt 21 and belt mount 62 of retainer plate 44 are wedged between first and second legs 48, 50 of belt guide 42 upon movement of retainer plate 44 to engage the underside 72 of wall 28. In the illustrated embodiment, first leg 48 is arranged to lean toward first rigidifying rib 73 and second leg 50 is arranged to lean toward second rigidifying rib 74 to define an acute included angle between first and second legs 48, 50.

Figure 8:
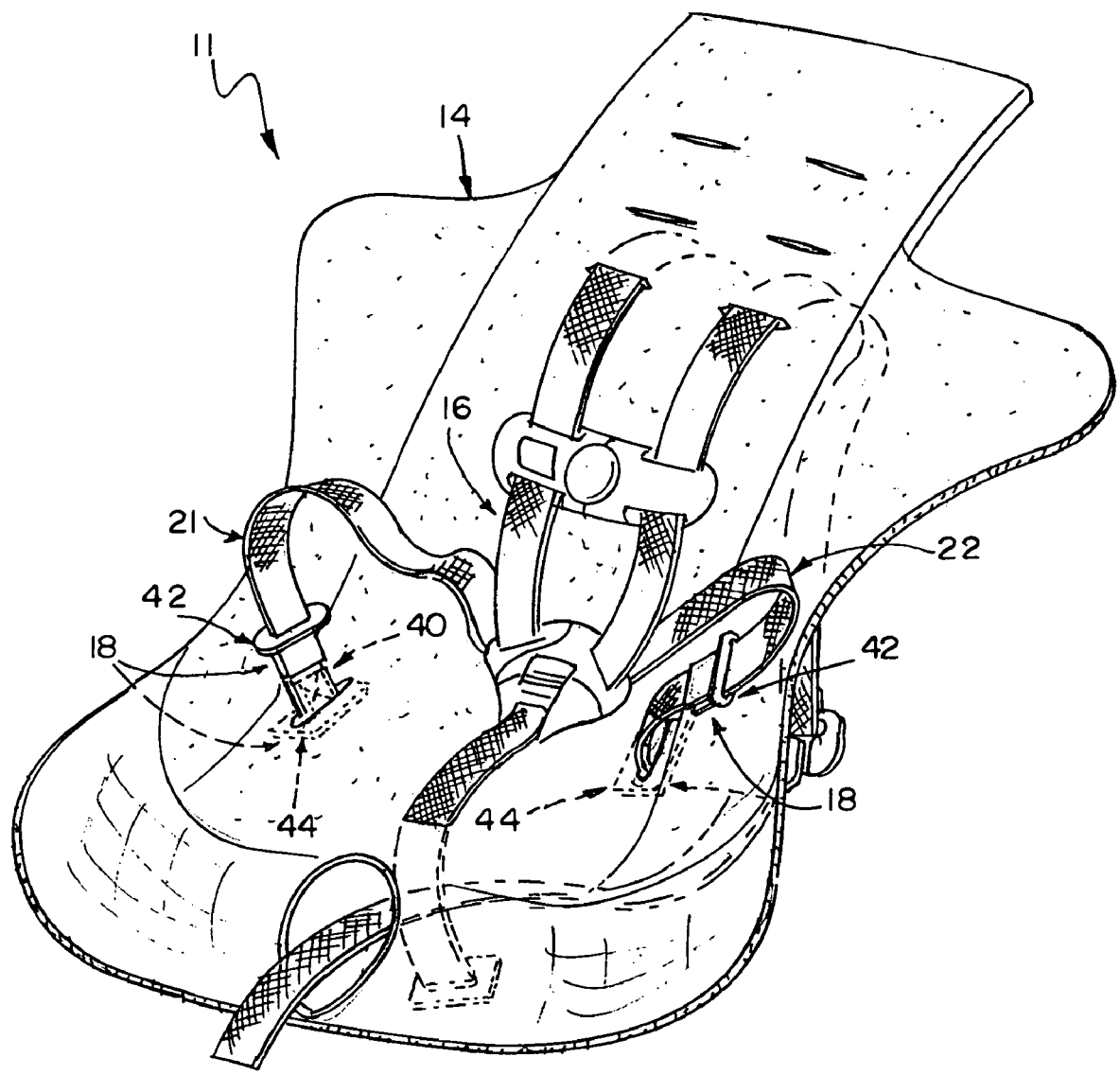
FIG. 8 is an enlarged perspective view of a subassembly comprising a seat pad and a child-restraint harness coupled to the seat pad before the subassembly is mounted on a seat shell included in a juvenile vehicle seat of the type shown, for example, in FIG. 1.

In an illustrative embodiment shown in FIG. 8, child-restraint harness 16 is coupled to seat pad 14 to form a subassembly 11. This subassembly 11 can be delivered by a supplier to an assembly line at a manufacturing plant. Subassembly 11 can be coupled to seat shell 12 at a factory by a technician or at home by a consumer. In either situation, quick-mount belt anchors 18 coupled to belts 21, 22 (and perhaps other belts in child-restraint harness 16) are coupled quickly and easily to seat shell 12 in the manner disclosed herein.

The invention claimed is:

1. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall, and
a belt anchor including a belt guide having legs and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to splay legs and to engage an opposite second side of the wall, and the harness portion is arranged to extend from the free end through the belt-receiver channel formed in the belt guide.

2. The seat of claim 1, wherein the belt guide includes a perimeter rim formed to include the belt-receiver channel and arranged to face toward the first side of the wall and the legs are cantilevered to the perimeter rim and arranged to extend through the slot formed in the wall of the seat shell and lie in spaced-apart relation to one another to define a space therebetween receiving the harness portion of the belt therein during movement of the retainer plate toward the opposite second side of the wall.

3. The seat of claim 2, further comprising a seat pad formed to include a slot and arranged to engage the first side of the wall to align the slot formed in the seat pad with the slot formed in the wall, and wherein the legs extend through the slot formed in the seat pad and the free end of the belt terminates in a space provided between the legs.

4. The seat of claim 2, wherein the retainer plate includes means for spreading the free end of the belt to assume a spread width to block movement of the free end of the belt through the belt receiver channel formed in the belt guide and through the slot formed in the wall of the seat shell so that the free end of the belt is anchored to the seat shell.

5. The seat of claim 4, wherein the belt guide further includes a belt retainer appended to the first leg and the belt retainer includes ramp means for urging the first leg away the second leg during movement the free end of the the belt away toward the belt receiver channel formed in the belt guide and stop means for blocking movement of the free end to assume the spread width.

6. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide,
wherein the belt guide includes a perimeter rim formed to include the belt-receiver channel and arranged to face toward the first side of the wall and first and second legs cantilevered to the perimeter rim and arranged to extend through the slot formed in the wall of the seat shell and lie in spaced-apart relation to one another to define a space therebetween receiving the harness portion of the belt therein during movement of the retainer plate toward the opposite second side of the wall,
further comprising a seat pad formed to include a slot and arranged to engage the first side of the wall to align the slot formed in the seat pad with the slot formed in the wall, and wherein the first and second legs extend through the slot formed in the seat pad and the free end of the belt terminates in a space provided between the first and second legs, and
wherein the perimeter rim is arranged to engage the seat pad and the belt guide further includes a belt retainer appended to the first leg and arranged to confront the free end of the belt to block movement of the free end of the belt and the retainer plate coupled to the free end of the belt away from the wall of the seat shell.

7. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide, wherein the belt guide includes a perimeter rim formed to include the belt-receiver channel and arranged to face toward the first side of the wall and first and second legs cantilevered to the perimeter rim and arranged to extend through the slot formed in the wall of the seat shell and lie in spaced-apart relation to one another to define a space therebetween receiving the harness portion of the belt therein during movement of the retainer plate toward the opposite second side of the wall, and wherein the free end of the belt includes a looping section coupled to the retainer plate and located between the first and second legs and the looping section has a spread width that is greater than a width of the belt-receiver channel to block movement of the looping section through the belt-receiver channel upon engagement of the retainer plate and the opposite second side of the wall.

8. The seat of claim 7, wherein the retainer plate includes a perimeter flange arranged to engage the opposite second side of the wall and a belt mount coupled to the perimeter flange to form a first opening receiving a first portion of the looping section and a second opening receiving a second portion of the looping section and wherein the belt mount is located between the first and second legs and sized to spread the looping section to assume the spread width upon movement of the perimeter flange to engage the opposite second side of the wall.

9. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide,
wherein the belt guide includes a perimeter rim formed to include the belt-receiver channel and arranged to face toward the first side of the wall and first and second legs cantilevered to the perimeter rim and arranged to extend through the slot formed in the wall of the seat shell and lie in spaced-apart relation to one another to define a space therebetween receiving the harness portion of the belt therein during movement of the retainer plate toward the opposite second side of the wall, and
wherein the retainer plate includes a belt mount arranged to extend through a space provided in the free end of the belt to couple the retainer plate to the free end and wherein the belt mount and the free end of the belt cooperate to splay the first and second legs to cause the first and second legs to diverge in a direction away from the slot formed in the wall of the seat shell to block movement of the first and second legs through the slot formed in the wall of the seat shell so that the belt guide is retained in a fixed position in the slot formed in the wall of the seat shell.

10. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide,
wherein the belt guide includes a perimeter rim formed to include the belt-receiver channel and arranged to face toward the first side of the wall and first and second legs cantilevered to the perimeter rim and arranged to extend through the slot formed in the wall of the seat shell and lie in spaced-apart relation to one another to define a space therebetween receiving the harness portion of the belt therein during movement of the retainer plate toward the opposite second side of the wall, and
wherein the seat shell further includes a first rigidifying rib appended to the opposite second side of the wall and a second rigidifying rib appended to the opposite second side of the wall to lie in spaced-apart and closely confronting relation to the first rigidifying rib to rigidify the wall in a region around the slot and to define a narrow channel therebetween containing the first and second legs and the retainer plate.

11. The seat of claim 10, wherein the free end of the belt and a portion of the retainer plate coupled to the free end of the belt are wedged between the first and second legs upon movement of the retainer plate to engage the opposite second side to splay the first and second legs so that the first leg is angled to lean toward the first rigidifying rib and the second leg is arranged to lean toward the second rigidifying rib to define an acute included angle between the first and second legs.

12. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide,
wherein the belt guide includes a perimeter rim formed to include the belt-receiver channel and arranged to face toward the first side of the wall and first and second legs cantilevered to the perimeter rim and arranged to extend through the slot formed in the wall of the seat shell and lie in spaced-apart relation to one another to define a space therebetween receiving the harness portion of the belt therein during movement of the retainer plate toward the opposite second side of the wall, and wherein the retainer plate is formed to include a first opening receiving the first leg therein, a second opening receiving the second leg therein, and a belt mount located between the first and second openings and coupled to the free end of the belt.

13. The seat of claim 12, wherein the retainer plate further includes a perimeter flange arranged to border portions of the first and second openings and coupled to the belt mount and wherein the free end of the belt includes a first portion arranged to extend through the first opening and lie in a space provided between the first leg and the belt mount and a second portion arranged to extend through the second opening and lie in a space provided between the second leg and the belt mount.

14. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall, and
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide, wherein the harness portion includes a lower section of the belt, an anchor section of the belt, and a fastener extending through and fixing the anchor section to the lower section, and wherein the free end is defined by a looping section of the belt arranged to interconnect the lower section to the anchor section to form a space receiving a portion of the retainer plate therein.

15. The seat of claim 14, wherein the retainer plate includes a perimeter flange arranged to engage the opposite second side of the wall and a belt mount coupled to the perimeter flange to define the portion of the retainer plate received in the space formed by the looping section.

16. The seat of claim 15, wherein the belt mount and the looping section cooperate to define means for wedging a portion of the retainer plate in the slot formed in the wall of the seat shell to retain the free end of the belt in a fixed position relative to the seat shell.

17. The seat of claim 14, wherein the portion of the retainer plate includes means for spreading the free end of the belt to assume a spread width to block movement of the free end of the belt through the belt receiver channel formed in the belt guide and through the slot formed in the wall of the seat shell so that the free end of the belt is anchored to the seat shell.

18. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide, wherein the harness portion includes a lower section of the belt, an anchor section of the belt, and a fastener to fix the anchor section to the lower section, and wherein the free end is defined by a looping section of the belt arranged to interconnect the lower section to the anchor section to form a space receiving a portion of the retainer plate therein,
wherein the portion of the retainer plate includes means for spreading the free end of the belt to assume a spread width to block movement of the free end of the belt through the belt receiver channel formed in the belt guide and through the slot formed in the wall of the seat shell so that the free end of the belt is anchored to the seat shell, and
wherein the belt guide includes first and second legs arranged in spaced-apart relation to one another and to extend through the slot in the wall and a belt retainer appended to the first leg, and wherein the belt retainer includes ramp means for urging the first leg away from the second leg during movement of the free end of the belt toward the belt receiver channel formed in the belt guide and stop means located between the ramp means and the wall for blocking substantial movement of the free end of the belt away from the wall of the seat shell to retain the free end of the belt in a fixed position relative to the seat shell.

19. A juvenile vehicle seat comprising
a seat shell formed to include a wall and a slot in the wall,
a child-restraint harness including a belt having a free end lying below the wall and a harness portion extending from the free end through the slot in the wall to lie in a region above the wall,
a belt anchor including a belt guide and a retainer plate configured to cooperate with the belt guide to anchor the belt to the wall of the seat shell, wherein the belt guide is arranged to face toward a first side of the wall and formed to include a belt-receiver channel, the retainer plate is coupled to the free end of the belt and arranged to engage an opposite second side of the wall, and the harness portion is arranged to extend from the free end through the belt-receiver channel formed in the belt guide, and
a seat pad formed to include a slot and arranged to engage the first side of the wall to align the slot formed in the seat pad with the slot formed in the wall and wherein the harness portion of the belt is arranged to extend through the slot formed in the seat pad, the belt guide includes a perimeter rim formed to include the belt-receiver channel and arranged to face toward the first side of the wall, a portion of the seat pad bordering the slot formed in the seat pad is interposed between the perimeter rim and the first side of the wall, and the belt guide further includes a first leg coupled to the perimeter rim and arranged to extend through the slots formed in the seat shell and the seat pad and a belt retainer appended to the first leg and arranged to confront the free end of the belt to block movement of the free end of the belt and the retainer plate coupled to the free end of the belt away from the wall of the seat shell.

20. The seat of claim 19, wherein the retainer plate further includes a belt mount coupled to the perimeter rim and to the free end of the belt and wherein the belt guide further includes a second leg coupled to the perimeter rim and arranged to extend through the slots formed in the seat pad and the wall of the seat shell and the second leg is arranged to lie in spaced-apart relation to the first leg to define a space therebetween receiving the free end of the belt and the belt mount coupled to the free end of the belt.

21. The seat of claim 20, wherein the seat shell further includes a first rigidifying rib appended to the opposite second side of the wall and a second rigidifying rib appended to the opposite second side of the wall to lie in spaced-apart and closely confronting relation to the first rigidifying rib to rigidify the wall in a region around the slot and to define a narrow channel therebetween containing the first and second legs and the retainer plate, and the free end of the belt and the belt mount are wedged between the first and second legs upon movement of the retainer plate to engage the opposite second side to splay the first and second legs so that the first leg is angled to lean toward the first rigidifying rib and the second leg is arranged to lean toward the second rigidifying rib to define an acute included angle between the first and second legs.

22. The seat of claim 20, wherein the retainer plate is formed to include a first opening receiving the first leg therein, a second opening receiving the second leg therein, and the belt mount is located between the first and second openings.

23. The seat of claim 22, wherein the perimeter flange is arranged to border portions of the first and second openings and coupled to the belt mount and wherein the free end of the belt includes a first portion arranged to extend through the first opening and lie in a space provided between the first leg and the belt mount and a second portion arranged to extend through the second opening and lie in a space provided between the second leg and the belt mount.

24. The seat belt of claim 19, wherein the free end of the belt includes a looping section coupled to the retainer plate and located between the first and second legs and the looping section has a spread width that is greater than a width of the belt-receiver channel to block movement of the looping section through the belt-receiver channel upon engagement of the retainer plate and the opposite second side of the wall.

25. The seat of claim 24, wherein the retainer plate includes a perimeter flange arranged to engage the opposite second side of the wall and a belt mount coupled to the perimeter flange to form a first opening receiving a first portion of the looping section and a second opening receiving a second portion of the looping section and wherein the belt mount is located between the first and second legs and sized to spread the looping section to assume the spread width upon movement of the perimeter flange to engage the opposite second side of the wall.

26. The seat of claim 19, wherein the retainer plate includes means for spreading the free end of the belt to assume a spread width to block movement of the free end of the belt through the belt receiver channel formed in the belt guide and through the slot formed in the wall of the seat shell so that the free end of the belt is anchored to the seat shell.

27. A juvenile vehicle seat comprising
a seat shell formed to include a wall and a slot in the wall,
a child-restraint harness including a belt extending through the slot, and
a belt anchor including a belt guide formed to include a belt-receiver channel and arranged to confront a first side of the wall and to extend through the slot, the belt extending through the belt-receiver channel, the belt anchor further including a retainer plate arranged to confront an opposite second side of the wall and provide means for spreading a free end of the belt to assume a spread width that is greater than a width of the belt-receiver channel to block removal of the belt guide from the slot formed in the wall of the seat shell.

* * * * *